March 11, 1952 F. E. WOOD ET AL 2,589,180

MULTILINE TELEPHONE SUBSTATION INSTRUMENT AND CIRCUITS

Filed June 10, 1949 7 Sheets-Sheet 1

INVENTORS
FREDRIC E. WOOD
ROBERT L. SARGISSON

BY Chas. Tu. Candy

ATTORNEY

MULTILINE TELEPHONE SUBSTATION INSTRUMENT AND CIRCUITS

Filed June 10, 1949 7 Sheets-Sheet 2

INVENTORS.
FREDRIC E. WOOD
ROBERT L. SARGISSON
BY
Chas. Lee. Candy
ATTORNEY

March 11, 1952 F. E. WOOD ET AL 2,589,180

MULTILINE TELEPHONE SUBSTATION INSTRUMENT AND CIRCUITS

Filed June 10, 1949 7 Sheets-Sheet 3

INVENTORS
FREDRIC E. WOOD
ROBERT L. SARGISSON
BY
ATTORNEY

MULTILINE TELEPHONE SUBSTATION INSTRUMENT AND CIRCUITS

INVENTORS.
FREDRIC E. WOOD
ROBERT L. SARGISSON
BY
Chas. Lu. Candy
ATTORNEY

MULTILINE TELEPHONE SUBSTATION INSTRUMENT AND CIRCUITS

Filed June 10, 1949 7 Sheets-Sheet 5

INVENTORS
FREDRIC E. WOOD
ROBERT L. SARGISSON
BY Chas. Lee. Candy
ATTORNEY

MULTILINE TELEPHONE SUBSTATION INSTRUMENT AND CIRCUITS

Filed June 10, 1949 7 Sheets-Sheet 6

INVENTORS.
FREDRIC E. WOOD
ROBERT L. SARGISSON
BY
[signature]
ATTORNEY

MULTILINE TELEPHONE SUBSTATION INSTRUMENT AND CIRCUITS

Filed June 10, 1949 7 Sheets-Sheet 7

INVENTORS
FREDRIC E. WOOD
ROBERT L. SARGISSON
BY
[signature]
ATTORNEY

UNITED STATES PATENT OFFICE 2,589,180

MULTILINE TELEPHONE SUBSTATION INSTRUMENT AND CIRCUITS

Fredric E. Wood, McHenry, and Robert L. Sargisson, Berwyn, Ill., assignors to Automatic Electric Laboratories, Inc., Chicago, Ill., a corporation of Delaware Application June 10, 1949, Serial No. 98,236

17 Claims. (Cl. 179—99)

This invention relates in general to telephone systems, but more particularly to substation instruments and circuits, and the main object is to increase the usefulness of telephone instruments; to facilitate the acts required to manipulate them.

It is the object of the invention to provide a telephone instrument and circuits for answering and holding on three lines. The lines may be trunk lines, local lines or intercommunication lines, or any combination of the three.

Another object of this invention is to provide a telephone and circuits for answering and holding on two lines; with answering on a third line; with signalling on an extension line; and with exclusion or inclusion, as may be desired on the extension line.

A further object of the present invention is to provide a telephone instrument and circuits whereby the subscriber of this instrument can transfer an outside call through his telephone instrument to a desired local subscriber's line, and to provide an automatic and independent release of such call when the local subscriber restores his handset. A feature is that the subscriber still has use of his telephone, although the trunk line, which has been transferred to a local subscriber, is still connected to the local subscriber.

A further object of this invention is to provide a telephone instrument that has double interlocking line connecting keys so that when the subscriber depresses either line connecting key, he simultaneously restores to a normal position the other line connecting key, if it is in an operated position; and the associated holding key, if it is also in an operated position.

A further object of this invention is to provide a telephone instrument with a push-pull key to afford additional services to the subscriber.

Another object of this invention is to provide a telephone instrument which enables the subscriber to restore to normal position all operated holding keys and the push-pull key, if it is in an operated position, by placing the handset on the cradle.

The above objects and others not specifically mentioned will be apparent from the detailed description, which together with the drawings constitute a preferred embodiment of the invention.

Figure 1:
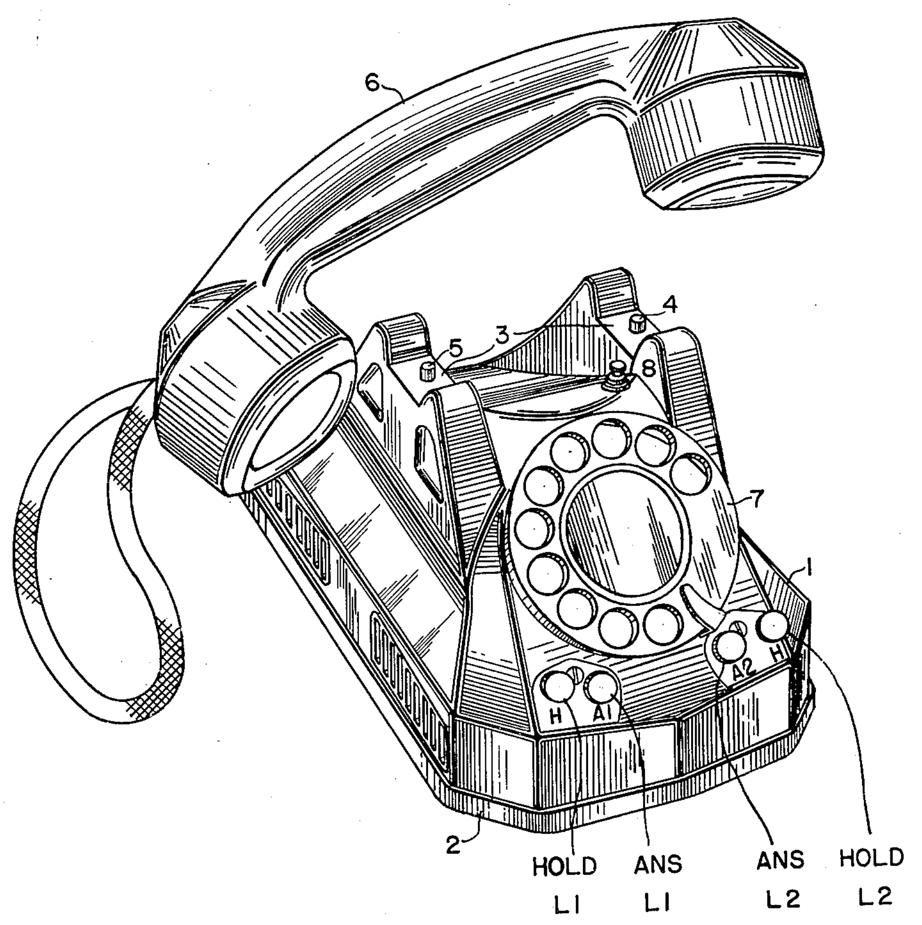
Figure 3:
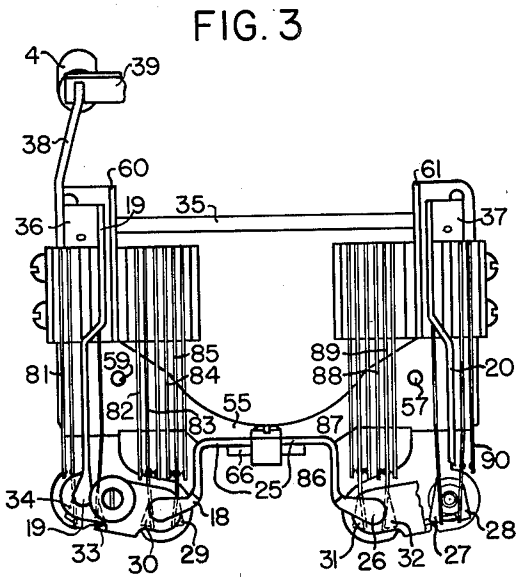
Figure 4:
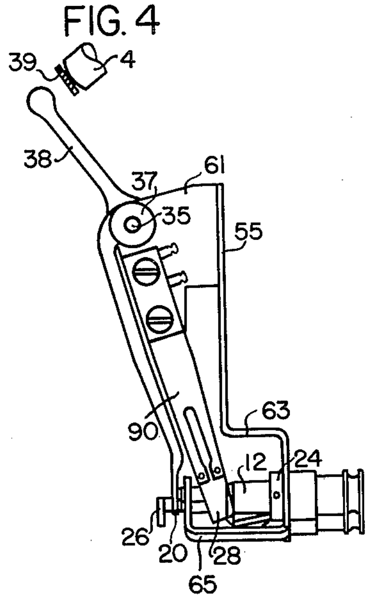
Figure 2:
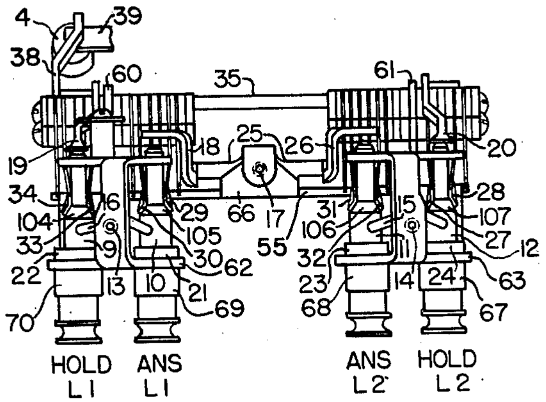
Figure 6:
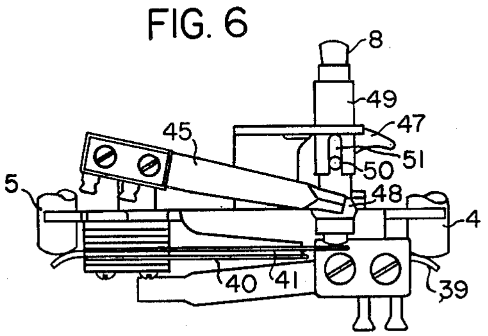
Figure 5:
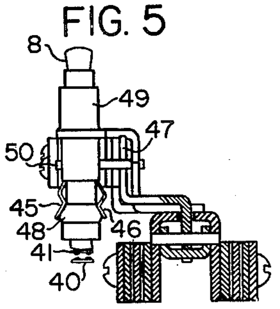
Figure 7:
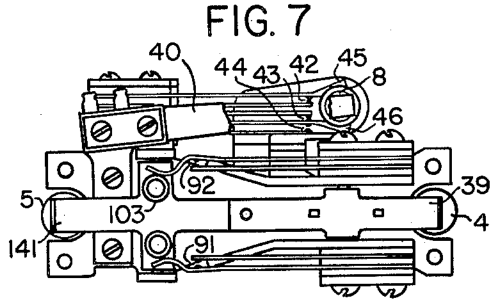
Figure 8:
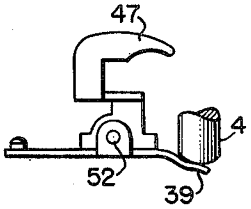
Figure 9:
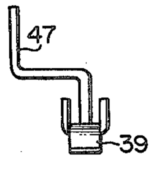
Figure 11:
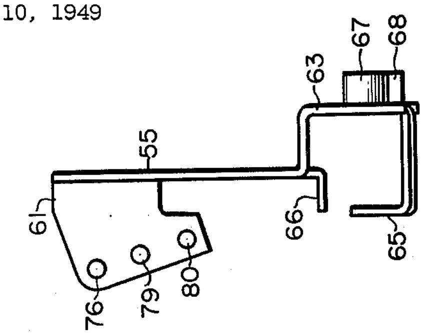
Figure 10:
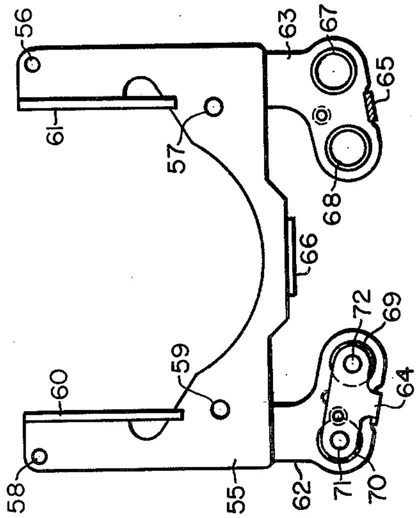
Figure 13:
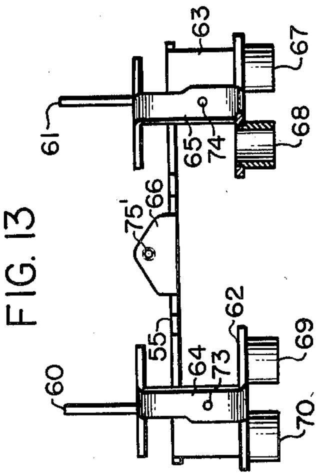
Figure 12:
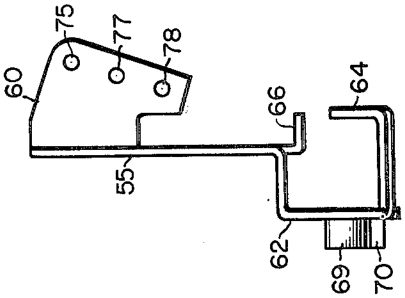
Figure 15:
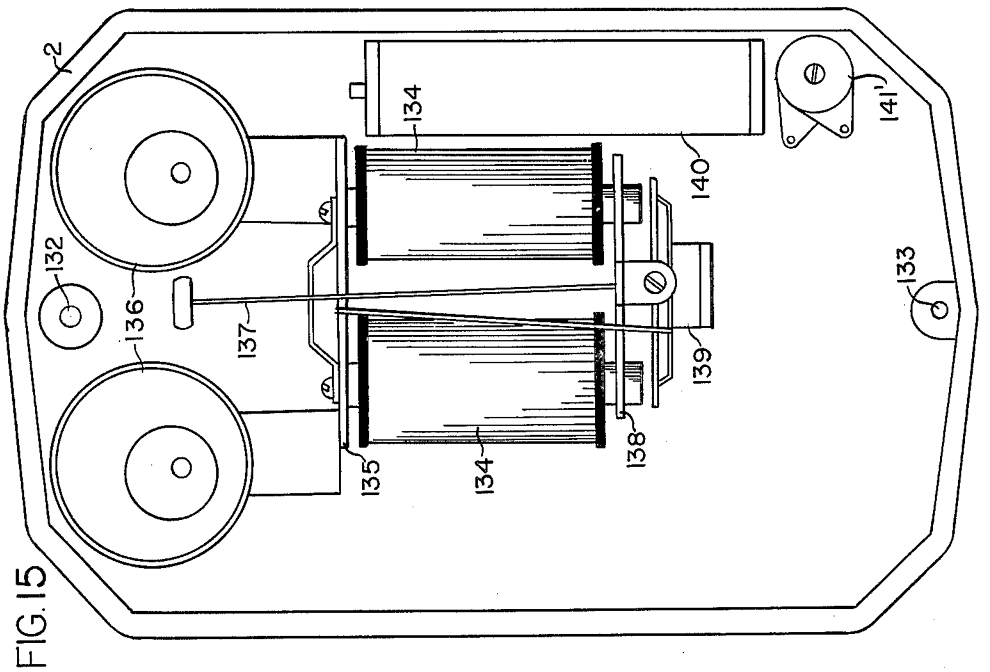
Figure 14:
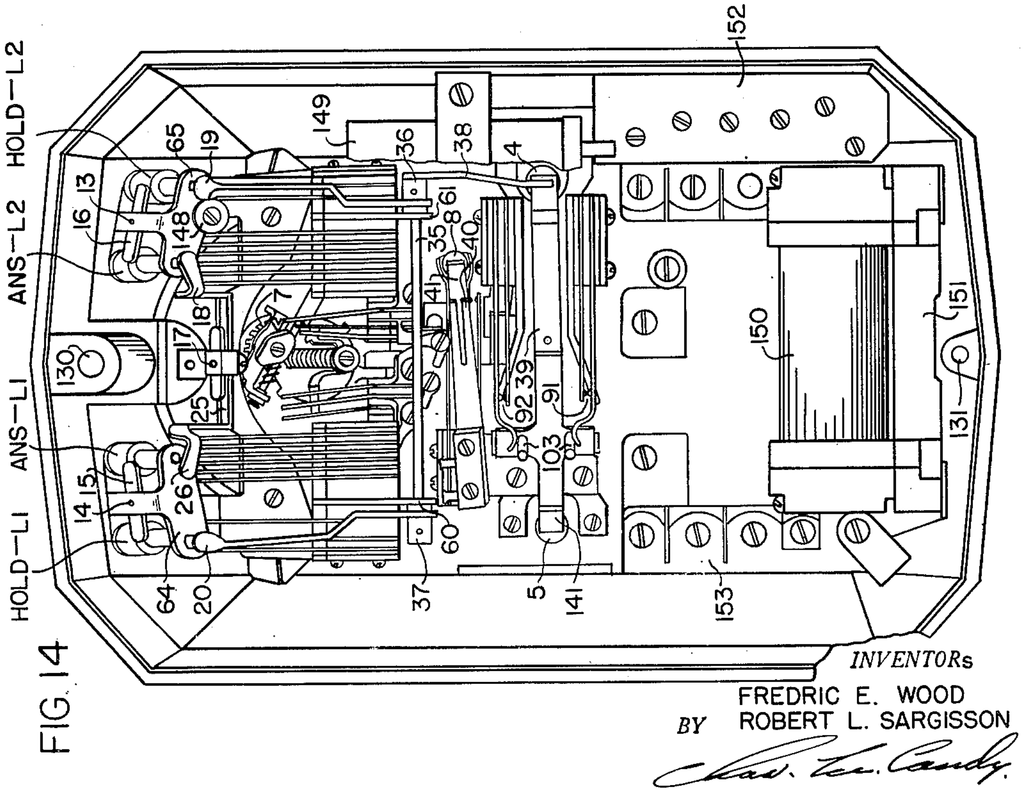
Figure 16:
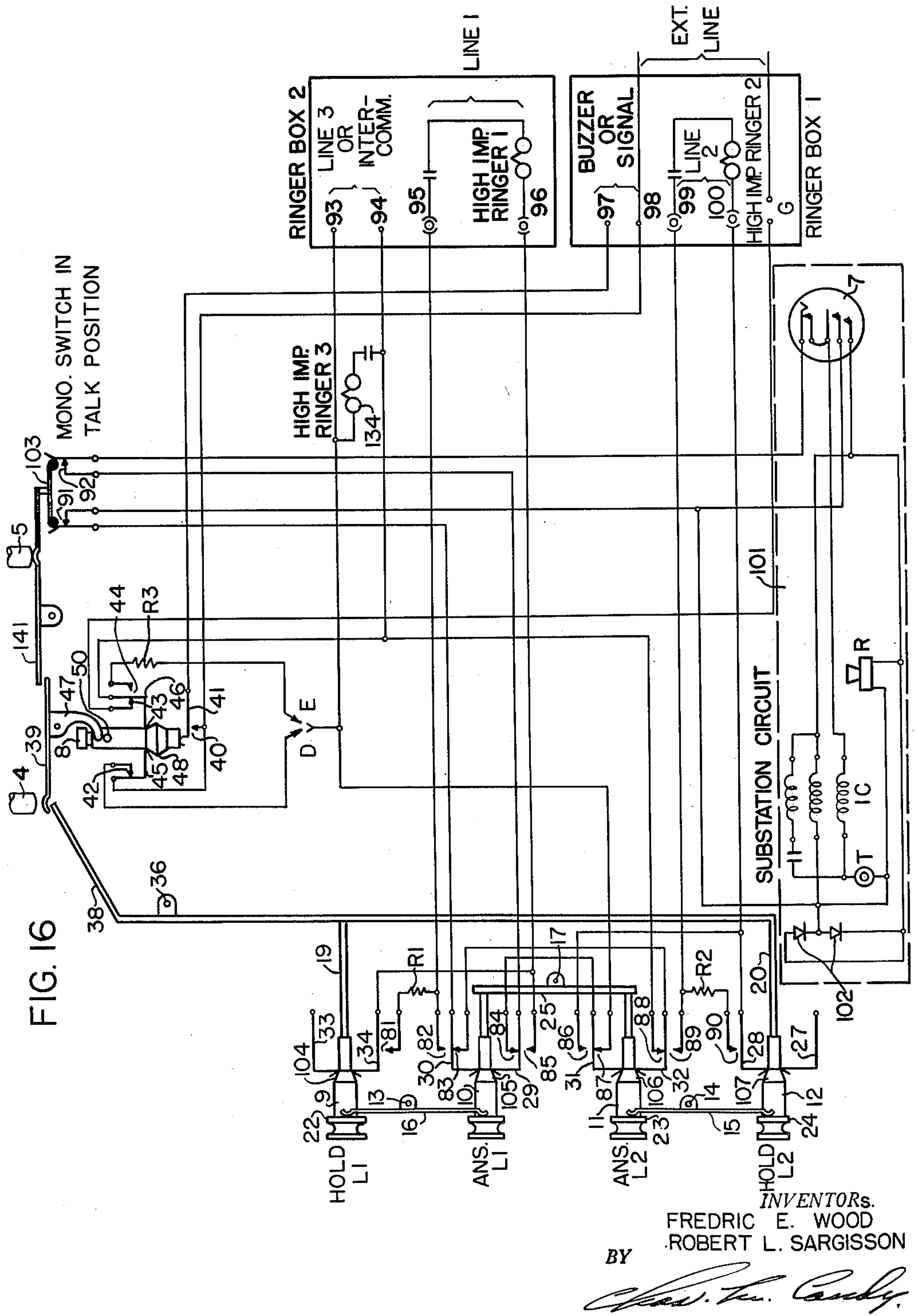
Figure 17:
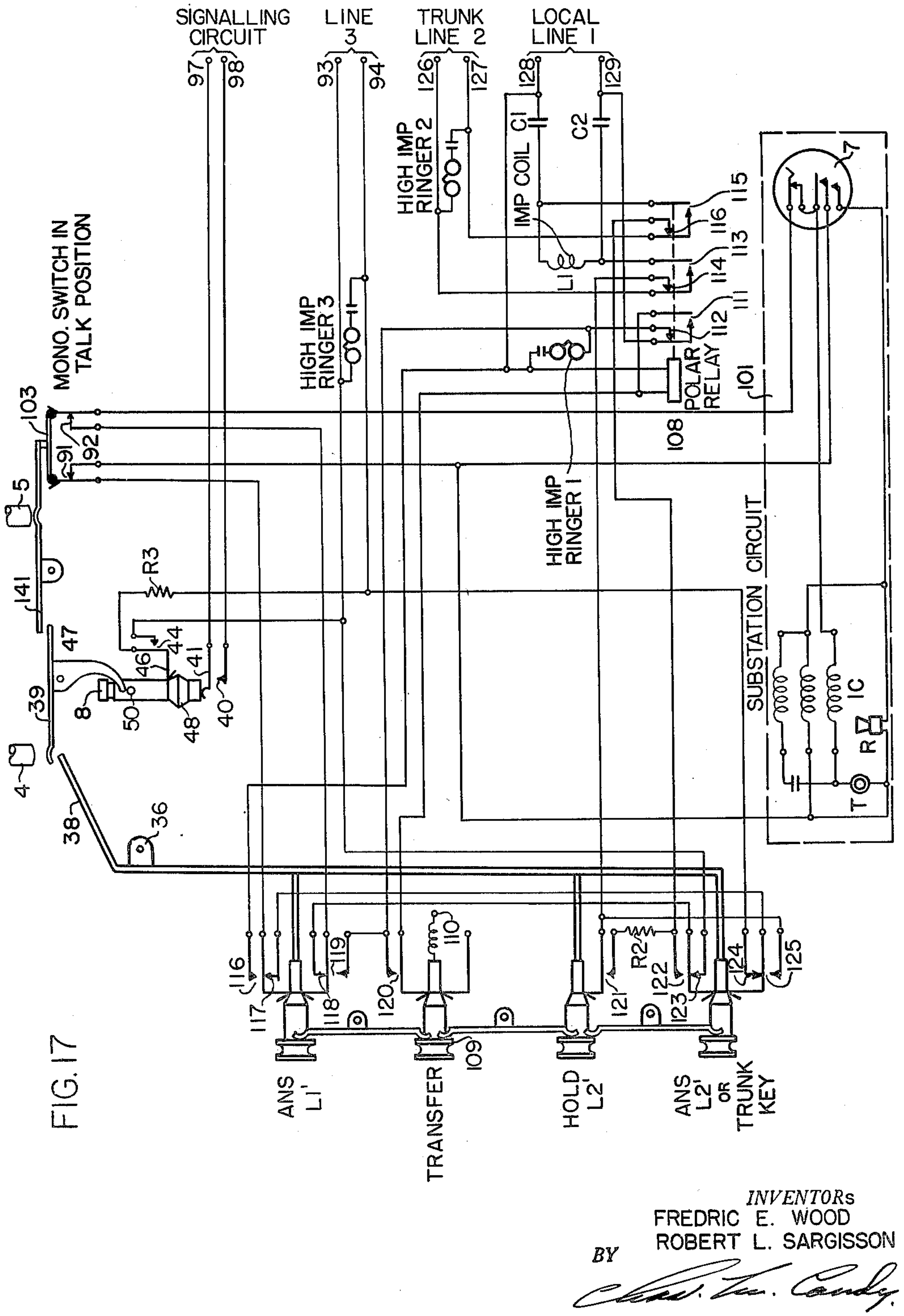

In the drawings, Fig. 1 shows a perspective view of cradle type desk telephone containing a number of push button keys and a push-pull key; Fig. 2 shows a partial front view of the push button key unit; Fig. 3 illustrates the bottom view of the push button key unit. Fig. 4 illustrates a side view of the push button key unit; Fig. 5 shows an end sectional view of the mechanical structure of the push-pull key. Fig. 6 shows a side view of the push-pull key arrangement and the cradle, or switchhook assembly unit. Fig. 7 illustrates a bottom view of the push-pull key and switchhook assembly unit; Fig. 8 shows a detail front view of the unlocking arm of the switchhook assembly unit; Fig. 9 shows the side view of the unlocking arm; Fig. 10 shows a bottom view of the push button mounting bracket; Figs. 11 and 12 each show an end view of the push button mounting bracket; Fig. 13 shows the front view of the push button mounting bracket. Figs. 14 and 15 illustrate the arrangement of the apparatus inside the cover of the telephone set. Fig. 16 illustrates the schematic circuits for the telephone instrument, and also points out the mechanical arrangement of the keys and their relationship to the electrical circuits. Fig. 17 is a modification of Fig. 16 and shows schematic circuits for the transfer operation of a trunk line call to a local line.

Referring now to Fig. 1, this telephone instrument is of the same type as shown in Design Patent 117,876 issued November 28, 1939, to H. F. Obergfell having however push buttons, or answer keys, A1 and A2, hold keys H and a push-pull button, or key, 8 mounted in the housing, or cover, 1 for enabling this instrument to have various connections to be described more fully hereinafter. The cover 1 has a cradle 3 in which the handset 6 rests when the instrument is not in use. Two plungers 4 and 5 located in the cradle 3 are actuated by removal and replacement of the handset from the cradle. Plunger 4 is the release plunger for controlling the release of any actuated keys when the handset is replaced on the cradle. Flash plunger 5 permits opening and closing of the cradle, or switchhook springs, when manually actuated without interfering with the operated condition of any of the push button keys. A well-known dial or calling device, 7 is mounted on the face of cover 1. The push-pull key 8 is mounted on cover 1 as shown and comprises a three position key for controlling holding and signalling circuits. The answer and hold keys A1, A2 and H are mounted on cover 1 below dial 7 as shown and are provided for initiating, answering and holding calls on lines 1 and 2 which terminate in this instrument, Referring now to Figs. 2, 3, 4, 10, 11, 12, and 13 which show the detail construction of the answering and holding push button assembly unit which is mounted inside of cover 1 and located as shown in Fig. 14. This push button assembly unit comprises a base made from a single sheet of metal and bent as shown in Figs. 10, 11, 12, and 13. This base has a flat main body portion 55 with holes 56, 57, 58, and 59 through which screws extend for fastening the base to inserts in the cover 1. Two extension members 60 and 61 extend at right angles from the main body portion 55 and are provided with holes 77, 78, 79, and 80 for mounting the spring assemblies shown in Figs. 3, 4, and 14. Holes 76 and 75 are provided in the extension members 61 and 60 for rotatably mounting shaft 35, shown in Figs. 3, 4, and 14. Integral arms 62 and 63, at the outside edges of the main body portion 55, are bent at right angles as shown in Figs. 11 and 12 to form ears as shown in Fig. 10. A pair of holes is drilled in each of these holes and sleeves, such as sleeves 67, 68, 69, and 70, are fitted into these holes and welded to arms 62 and 63 to provide mounting sleeves for the round push buttons, such as shown in Fig. 2. Further continuations of the base such as continuations 64 and 65, extend from the arms 62 and 63 as shown in Figs. 11, 12, and 13 and form ears having holes, such as holes 71 and 72, through which the reduced diameter of the push button keys extend thereby acting as guides for the push button keys as well as back-stops for lever arm 25, shown in Fig. 2. Holes 73 and 74 are provided in the continuations 64 and 65 for rotatably mounting the lever arms 15 and 16 shown in Fig. 2. A center portion 66 extends from near the middle of the main body portion 55 and has a hole 75 therein for rotatably mounting the lever arm 25, as shown in Figs. 2 and 3.

Referring now to push button key unit shown in Figs. 2, 3, and 4 it will be seen that the push button keys, such as Hold L1, Ans. L1, Ans. L2, and Hold L2, are generally round rods of insulating material having different diameters at different locations throughout their length. The upper ends of each push button has circular flanges which extend through the holes provided in the cover to enable the user to push and pull such push buttons. The central portion of each push button is of a diameter slightly smaller than the holes in sleeves 67, 68, 69, and 70 to permit such push buttons to easily slide in such sleeves. A collar, such as collars 21, 22, 23, and 24 is secured to the middle portion of each push button to abut against ears 62, 63, thereby acting as a stop for each push button. These collars 21, 22, 23, and 24 also cooperate with the levers 15 and 16, when rotated, to return the push buttons to their normal positions. The levers 15 and 16 are rotatably mounted on continuation members 64 and 65 in a plane between the push buttons and the continuation members 64 and 65. The circular bevel portions, such as 104, 105, 106, and 107 of the push buttons are provided for actuating the extension springs, such as springs 33, 34, 30, 29, 31, 32, 27, and 28, to operate their associated spring control assemblies. The ends of these extension springs are V-shaped to conform to the circular bevel portions and the smaller stem portion of the push buttons so that the spring assemblies are operated when the push buttons are depressed. The springs such as 27, 28, 31, 32, 29, 30, 33, and 34 hold their respective push buttons in a depressed position when so operated. The bottom portions of each of the push buttons are of smaller diameter and extend through the holes, such as 71 and 72, in ear portions of 64 and 65 where the ends of the push buttons are engageable by lever ends 18, 19, 20, and 26 for restoring the push buttons to normal when such lever ends are actuated. A lever 25, shown more clearly in Figs. 2 and 3, is pivotally mounted in hole 75' of base member 66 and has extension arms 18 and 26 for engaging the ends of push buttons 10 and 11 for restoring one of such push buttons to normal when the other push button is actuated; these push buttons being the answer push buttons and are arranged so that the actuation of any one answer push button restores the other answer push button.

A shaft 35 is rotatably mounted in holes 75 and 76 of base members 60 and 61 for rotating the lever arms 19 and 20 which are secured to shaft 35 by sleeves 36 and 37 and setscrews through such sleeves. Lever arm 38 is also permanently secured to shaft 35 and is provided for rotating shaft 35 and lever arms 19 and 20 whenever the member 39 is actuated by depressing the plunger 4 in the cradle. Rotation of lever arms 19 and 20 cause restoration of the outside hold push buttons to normal positions when the plunger 4 is depressed by restoration of the handset to the cradle. The spring assembly comprising contact springs 81 to 91, inclusive, are mounted in the usual manner to the base member 60 and 61. Depression of a push button, such as push button Ans. L1, causes the circular bevel 105 to actuate extension springs 29 and 30 to open contacts 83 and 84 and close contacts 82 and 85. In a similar obvious manner the other spring assembly contacts are operated by their associated push buttons.

Figs. 5, 6, and 7, show the push-pull key and switch hook assembly unit and the switch hook assembly portion is substantially the same as that shown and described in Patent 2,272,474 issued February 10, 1942, to H. F. Obergfell. In this particular instance the push-pull key apparatus has been added to the switch hook assembly portion to form a continuation unit. The push-pull key 8 is a three position key which is a generally round rod of insulating material having different diameters at different locations throughout its length. The upper end has a circular flange which extends through a hole provided in the cover to enable the user to push and pull such key. The central portion of the push-pull key 8 is of a diameter slightly larger than the diameter of the flange, but of such size as to permit the key to easily slide in the sleeve 49 which is secured to the cover. The circular bevel portion 48 has a diameter slightly larger than the diameter of the central portion of key 8 and is provided for actuating the extension springs 45 and 46, when the key 8 is in a pull position so as to operate the associated spring contacts 42, 43, and 44. The extension springs 45 and 46 hold the key 8 in the pull position. The ends of the extension springs 45 and 46 are V-shaped to conform to the circular bevel portions. The bottom portion of the key 8 has a smaller diameter than the circular bevel and is used to actuate the extension springs 40 and 41, when the key is in the depressed position so as to operate the associated spring contacts. The extension spring 41 restores the key 8 to its normal position upon the release of the force depressing the key. A restoral pin 50, a round metallic pin, is mounted within the push-pull key 8 with two ends of the pin extending outward from both sides of the push-pull key so as to be perpendicular to the longitudinal axis of the push-pull key 8. As the key 8 is raised to a pull position, one end of the restoral pin 50 will move upward in the keyway 51 guiding the key in the movement, and the other end of the restoral pin, which is the longer end, will move upward to engage the unlocking arm 47. The keyway 51 is a cut-away section of the sleeve 49. The unlocking arm 47, shown more clearly in Figs. 8 and 9, is secured to the member 39 by rivets, and comprises a two-right angle piece. The upper right angle section has an inner curvature which engages the restoral pin. The lower right angle section is the portion secured to the member 39, and through which passes the pivotal pin 52. To restore key 8 from the pull position to its normal position, plunger 4 is depressed to actuate member 39. The movement of member 39 causes the unlocking arm 47 to pivot about pin 52 in a rotary movement. In so doing, the upper right angle section of the unlocking arm 47 actuates the restoral pin 50 in a slidable motion causing the key 8 to occupy a normal position. Fig. 6 shows the position of the unlocking arm 47 when the plunger 4 is depressed.

Referring now to Figures 4 and 5 which illustrate the arrangement of the apparatus within the cover 1 and the base 2. The cover 1 is fastened to the base 2 by means of screws through the apertures 132 and 133 into threaded inserts 130 and 131 in the cover. Centrally located on the base 2 is the usual pair of ringer coils 134 supported by bracket member 135. The ringer coils actuate the gongs 136 by means of clapper rod 137 in the usual manner. The gongs 136 are attached to the bracket member 135. The clapper rod 137 is secured to the armature 138 and pivotally mounted opposite the ends of the ringer coils 136. A permanent magnet 139 is fastened at its lower end by means of a strap member to the bracket 135. A condenser 140 is positioned parallel to the ringer coils 134, and to one side as to be forward of the gongs 136. A rectifier 141' fastened to the base 2 by means of a screw is positioned at the base of condenser 140.

The cover 1 is the portion of the substation upon which the handset 6 is rested. This cover is formed generally in the shape of a truncated pyramid (Fig. 1). The center portion of the cover is the cradle 3, which is parallel to the base 2 of the substation. Protruding through the center of the cradle 3 are the plungers 4 and 5 representing the release and flash plungers. The release plunger 4 moves the overlapping member 39; whereas the flash plunger 5 moves the member 141. Positioned at both sides of the members 39 and 141 are two sets of switchhook contact springs 91 and 92. Positioned to one side of the level portion of the substation is the push-pull key 8, which protrudes from the outer portion of the substation. The push-pull key 8 actuates the set of contact springs 41—40. In the center of the inclined portion adjacent to key 8 is the dialing mechanism 7. In a longitudinal position are four sets of contact springs 81 to 90. Two sets of springs are positioned at each side of the dialing mechanism 7. Extending forward of the dialing mechanism 7 so as to be opposite the gongs 136 are four push button keys Ans. L1, Hold L1, Ans. L2, and Hold L2. The above-mentioned push button keys are positioned in sets so as to have each set on opposite sides of the dialing mechanism 7. Common to each set of push button keys are the pivotal members 15 and 16, which are centrally located to each set of push button keys so as to be engaged upon operation of each individual set of push button keys. Positioned between the two inner push button keys, Ans. L1, and Ans. L2, is the pivotal member 25. The member 25 extends beyond the dialing mechanism 7 and engages the push button keys Ans. L1 and Ans. L2, when either key is operated. Parallel to the sets of contact springs are the parallel members 19 and 20, which engage the outer push button keys Hold L1 and Hold L2. The parallel members 19 and 20 act in response to movement of shaft 35. The screw and washer combination 148 is positioned between push button keys Hold L2 and Ans. L2, and acts as a back stop for the parallel member 19. In a longitudinal position off to one side of plunger 4 and in the level portion is the condenser 149, which is shown as a cut-away section. Member 38 which moves in response to depressing of plunger 4 is located underneath the condenser 149. The condenser 149 is shown in part so as to enable the member 38 to be shown.

On the inclined portion of cover 1 and opposite contact springs 143 is the inductance coil 150, which is secured to the cover by bracket 151. On the same inclined portion on extreme opposite ends are positioned two terminal strips 152 and 153. The terminal strips 152 and 153 are perpendicular to the inductance coil 150.

Referring now to Fig. 16 for the electrical circuits embodied in the invention. The invention provides at times answering and holding on three lines. Lines 1, 2, and 3 may either be local lines or trunk lines or any combination thereof. Fig. 16 shows a schematic diagram of the circuit arrangement involved with a diagrammatic representation of the key units of the invention. The telephone substation circuit 101 is of the usual type and includes a transmitter T, a receiver R, a calling device 7, inductance coil 1C and a click suppressor 102. The monophone switch contacts 91 and 92 are shown in a talking position with the handset removed from the cradle.

Each line is provided with an individual high impedance ringer to serve their respective lines. The flash plunger 5 may be operated to signal the operator without restoring the hold keys when they are in an operated position. The release plunger 4 when depressed restores all operated holding keys to their normal position, and also restores the push-pull key 8 even though it is in a locked position.

Each communication line has an individual holding bridge R1, R2, and R3, and which are effective to hold the line connection in response to the operation of the respective holding keys L1, L2, and 8.

The invention also provides at other times answering and holding on two lines; with answering on a third line; with signalling an extension line; and with exclusion or inclusion of an extension line, as may be desired.

The spade connections D and E cannot be connected at the same time. When terminal E is connected to the circuit, a holding bridge R3 is connected to the circuit in response to the operation of key 8. When terminal D is connected to the circuit, an exclusion of the extension line is then permissible in response to the operation of key 8.

Assuming for the present discussion that terminal E is connected to the circuit. All keys, as shown in Fig. 16, are in their normal position, and the monophone switch 103 is in the talking position. The circuit, therefore, is prepared for a call on line 3 in the following manner: terminal 93, contact 87, contact 84, contact 92, through the substation circuit 101 in a manner well-known in the art, contact 91, contact 83, contact 88 and terminal 94.

Assuming that during the time the subscriber is talking over line 3 an incoming call is received on line 1 or line 2. The subscriber is aware of such incoming call by the operation of ringer 2 or ringer 3. Let us assume further that the subscriber is answering line 1. The next step for the subscriber is to raise the push-pull key 8. In so doing, he now places the holding bridge resistance R3 across line 3, which is effective for holding line 3 until the subscriber desires to talk again to the party on line 3. Upon raising the key 8 to a pull position, bevel portion 48 engages the several sets of springs causing contacts 42 and 43 to break, and causing contact 44 to make. Key 8 is locked by the springs 45 and 46. The holding circuit for line 3 is completed in the following manner: terminal 93, terminal E, R3, contact 44 and terminal 94.

Now that line 3 is held, the subscriber proceeds to answer his call on line 1, by first depressing answer key L1. By depressing answer key L1, circular bevel portion 105 actuates a set of springs causing contacts 83 and 84 to break, and causing contacts 82 and 85 to make. The talking circuit of line 3 is now opened, since contacts 29 and 30 broke the continuity of the talking circuit. A talking circuit is now completed for the call on line 1 in the following manner: terminal 95, contact 82, contact 91, through the substation circuit 101 in the usual manner, contact 92, contact 85 and terminal 96.

In case an incoming call is received on line 2 while the subscriber is talking on line 1, the subscriber may also answer the call on line 2 by first depressing the holding key L1. In so doing, the circular bevel portion 104 of holding key L1 actuates a set of springs and causes the contact 81 to make. The result, therefore, is to put a holding bridge resistance R1 across line 1, which is effective for holding the line until the subscriber once again desires to talk to the party on line 1. The holding circuit for line 1 is completed in the following manner: terminal 95, R1, contact 81 and terminal 96.

The subscriber in order to answer the call on line 2 must secondly depress the answer key L2. It is to be noted that the subscriber is holding a party on line 1 and a party on line 3, and by depressing answer key L2, he completes the talking circuit to the party on line 2. When the key Hold L1 was depressed, the answer key L1 was restored to its normal position in a manner previously described. Restoring the line connecting key L1 causes the circular bevel portion 105 to disengage the set of springs allowing contacts 83 and 84 to make and allowing contacts 82 and 85 to break. The effect, therefore, of contacts 82 and 85 breaking is to break the continuity of the talking circuit on line 1. Although the lines 1 and 3 are held, the talking circuits of these lines are not completed.

By depressing answer key L2, circular bevel portion 106 actuates a set of springs and causes contacts 86 and 89 to make and causes contacts 87 and 88 to break. The talking circuit for line 2 is completed in the following manner: terminal 99, contact 89, contact 83, contact 91, through the substation circuit 101 in a manner well-known in the art, contact 92, contact 84, contact 86 and terminal 100.

At this point, the subscriber desires to once again talk to the party on line 1, and still hold line 2. He does this by first depressing Hold L2. In so doing, holding key L2 actuates a set of springs and contact 90 is made. The holding circuit for holding line 2 is completed in the following manner: terminal 99, R2, contact 90 and terminal 100. As Hold L2 is depressed, Ans. L2 restores to its normal position in a manner previously described. When line connecting key L2 restores to its normal position, circular bevel portion 106 disengages a set of springs and in so doing contacts 87 and 88 make, and contacts 86 and 89 break. The continuity for the completion of the talking circuit for line 2 is broken, since 86 and 89 are no longer made.

When the subscriber once again depresses answer key L1, the talking circuit is completed in a manner previously described. Having depressed answer key L1, Hold L1 will automatically restore to normal position thereby opening contact 81, and the subscriber can now converse. The subscriber completes his conversation with the party on line 1, and line 1 is again prepared for future use.

At this point, the subscriber once again depresses answer key L2 to once again converse with the party on line 2. Upon depressing answer key L2, answer L1 and Hold L2 are restored to normal position in a manner previously described. The subscriber completes his talking circuit for line 2 in a manner previously described. Upon completion of the conversation with the party on line 2, line 2 is again prepared for future use. When answer key L2 was depressed and Hold L1 was restored to normal position contact 90 was opened. Upon contact 90 opening, there was no holding bridge effective on line 2 during the conversing period.

The subscriber can now complete his conversation with the party on line 3 by first restoring answer key L1 to its normal position, which can be done by depressing Hold L1. Next, the subscriber manually restores key 8 to its normal position. The talking circuit is completed for line 3 in a manner previously described.

When completing the conversation with the party on line 3, the subscriber then places his handset on the cradle. The restoration of the handset restores to normal position all operated holding keys, and even the push-pull key 8 when it is in an operated position. The telephone set is once again prepared for operation with all its keys in the normal position. It is to be noted that calls can be initiated or answered in any order desired over the respective lines, and need not follow the order chosen for discussion.

The invention is so designed that there can be no simultaneous talking on the several lines. When line connecting key L1 is operated, circular bevel portion 105 actuates a set of springs causing contacts 82 and 85 to make to hereby complete the talking circuit to line 1 and causing contacts 84 and 83 to break. In so doing, the talking circuit of line 3 is opened at contacts 83 and 84 thereby preventing talking on that line. Further, contacts 86 and 89 are open thereby preventing talking on line 2, since by mechanical operation line connecting key L1, when operated, restores line connecting key L2 to its normal position. In case line connecting key L2 fails to restore still no talking circuit is completed on line 2, since contacts 83 and 84 are open. A similar condition occurs in operation of line connecting key L2. When line connecting key L2 is operated contacts 87 and 88 are opened thereby preventing talking on lines 1 and 3. Line connecting key L1 is restored by the operation of line connecting key L2, and that further opens the talking circuit over the remaining two lines by opening contacts 82 and 85.

Assuming at this point of the discussion that terminal D is connected to the circuit and terminal E is removed from the circuit. Upon removing terminal E, the holding bridge resistance for line 3 is removed from the circuit. By connecting terminal D to the circuit, the telephone set now has answering and holding on two lines; with answering on a third line; with signalling an extension line, and exclusion and inclusion of an extension telephone, as may be desired.

The talking and holding circuits for line 1 and 2 are the same as were previously described with the terminal E connected to the circuit. The talking circuit for line 3 is the same as was previously described with the terminal E connected. By connecting terminal D to the circuit, the telephone set now has an extension line when key 8 is in the normal position; exclusion of an extension line with key 8 in the pull position; and signalling an extension line with key 8 in the depressed position.

A buzzer or any signalling device may be connected to the terminals 97 and 98. The buzzer or signalling device is not shown. When key 8 is depressed by the subscriber, circular bevel portion 48 engages contact spring 41 and contact 40 is made. In so doing the signalling circuit to signal the extension line is completed in the following manner; terminal 97, contact 40 and terminal 98. The resiliency of spring 41 will restore key 8 to its normal position, when the subscriber removes the downward force.

With all keys in a normal position, a talking circuit is completed between the subscriber and the extension line in the following manner: terminal 98, contact 42, terminal D, contact 87, contact 84, contact 92, through the substation circuit 101 in the usual manner, contact 91, contact 83, contact 88, contact 43, and terminal G. The extension line is also connected in multiple with line 3 in the following manner: terminal 98, contact 42, terminal D, terminal 93, terminal 94, contact 43 and terminal G. There are times when the subscriber will deem it desirable not to have the extension line connected to his talking circuit while he is conversing with a party on line 3. This condition of privacy is provided for in the present invention. When the subscriber desires to have the extension line connected to his talking circuit, he leaves the key 8 in its normal position as previously described. However, when the subscriber desired exclusion of the extension line, he raises key 8 to the pull position. Key 8 is then held in the lock position by the tension of springs 45 and 46. While key 8 is in the pull position, bevel portion 48 engages a set of springs and causes contacts 42 and 43 to break. The effect, therefore, is to open the extension line talking circuit to thereby prevent the party on the extension line from listening to the conversation on both the subscribers line and the third line. The talking circuit of line 3 is still complete in the manner previously described. The extension line can be used with line 3 when the subscriber is talking to a party on either line 1 or line 2. When line connecting key L1 is depressed, contacts 83 and 84 are broken in a manner previously described, thereby disconnecting the talking circuit of the extension line from line 1. In the same light, when line connecting key L2 is depressed, contacts 87 and 88 are broken. The result is to disconnect the talking circuit of the extension line from line 2.

Referring now to Figure 17, which shows an arrangement whereby the substation can transfer an outside trunk call to a local subscriber, and still use the substation for other calls. In this arrangement there is no need for an operator. The telephone instrument is adequately designed to have all operations performed at the instrument itself. This arrangement further provides automatic release when the called local line restores independently of control from the substation in Figure 15.

Figure 17 shows a schematic diagram of the circuit arrangement involved with a diagrammatic representation of the key units. The substation circuit 101 is of the usual type and includes a transmitter T, a receiver R, a calling device 7, and inductance coil IC. The monophone switch contacts 91 and 92 are in the talking position. Key 8 is a push-pull key which has been described in detail. Holding bridge resistance R3 is effective in providing a holding circuit for line 3 when key 8 is in the pull position. Holding bridge resistance R2 is effective in providing a holding circuit for line 2 when the holding key L2′ is depressed. Each line has an individual high impedance ringer to serve their respective lines. Flash plunger designated 5 is used to flash the operator without restoring any operated keys. Release plunger designated 4 when depressed restores answer key L1′, holding key L2′, and answer L2′ when the respective keys are in an operated position. Release plunger 4 when depressed also restores key 8 when it is in a pull position. Polarized relay designated 108 is used to connect the talking circuit of local line 1 directly to the talking circuit of trunk line 2. Transfer key 109 when depressed restores to normal position answer key L1′, when operated and simultaneously restores to normal position key Hold L2′, when in an operated position. When the subscribers releases the force used in depressing transfer key 109, transfer key 109 will automatically restore to normal position because of the resiliency of spring 110. Depressing Hold L2′ restores to normal position answer key L2′, when in an operated position. Depressing answer key L2′ restores to normal position key Hold L2′, when in an operated position. In more detail, the subscriber answers a trunk call on line 2, by depressing the line connecting key L2′. In so doing a talking circuit to the trunk line is completed in the following manner: terminal 126, contact 114, contact 125, contact 117, contact 91, through the substation circuit 101 in the usual manner, contacts 92, contact 118, contact 122, contact 116, and terminal 127.

To transfer this trunk call to a local line, the called subscriber depresses the holding key L2′. The effect, therefore, is to hold line 2 in the following manner: terminal 126, contact 114, contact 121, R2, contact 116 and terminal 127. When holding key L2′ was depressed, answer key L2′ was restored to normal position in a manner previously described in reference to Figure 2.

Now that the trunk call is held at the substation, the subscriber in the usual manner then dials the desired local subscriber over local line 1 by means of the calling device 7, and after depressing line connecting key L1′. The talking circuit to line 1 is completed in the following manner: terminal 128, contact 116, contact 91, through the substation circuit 101 in the usual manner, contact 92, contact 119, contact 112, and terminal 129. After completing the connection to the called local subscriber in the usual manner over line 1 and in order to complete the trunk line call to the called local line so that the respective parties can communicate with one another, the transfer key 109 is depressed. Depressing the transfer key completes the circuit to energize the polarized relay 108 over the following path: battery from the switch train, terminal 128, winding of polarized relay 108, contact 120, contact 112, and terminal 129 to ground.

When the substation is first connected to line 1, dial tone is first received and battery potential of ascertained polarity is present on the line. The potential stays the same polarity during the dialing period, but when the local line answers the call, the polarity is reversed in a well-known manner. When the transfer key is depressed by the called subscriber the polarized relay 108 is energized by the reversed polarity.

The polarized relay, operated over the above-traced circuit, is locked over the following circuit: ground, terminal 129, contact 111, winding of polarized relay 108, and terminal 128 to battery. Local line 1 is now connected to trunk line 2 over the following circuit: terminal 126, contact 113, condenser C2, terminal 129, to one side of line 1, and by way of terminal 128, condenser C1, contact 115, and terminal 127 to the other terminal of trunk line 2.

The impedance coil L1 is connected in multiple with line 1 and line 2, since contact 113 is made. Since there is no D. C. connection between line 1 and line 2, the impedance L1 across trunk line 2 is to prevent the connection from being released. Breaking of contact 112 disconnects ringer 1 from the circuit of the local line 1.

The depressing of transfer key 109 not only energizes the polarized relay 108, but also restores to normal position the line connecting key L1' and holding key L2' in a manner described in detail in reference to Figure 2. By restoring to normal position line connecting key L1', local line 1 is no longer connected to the talking circuit of the sub-station, since contacts 116 and 119 are now open. Since the holding key L2' previously restored to normal position line connecting key L2', line 2 is not connected to the talking circuit of the substation. Restoring of line connecting key L2' to normal position caused contacts 122 and 125 to break. Further since the polarized relay is operated, contacts 116, 114 and 112 break to prevent the substation circuit in Figure 17 from interfering with the established connection over local line 1 and trunk line 2.

While the party on the trunk line 2 is conversing with the party on local line 1, the substation subscriber can restore his handset 6 in the usual manner without interference with the established connection over local line 1 and trunk line 2. The substation subscriber (Figure 17) can now answer or initiate a call on line 3, although the party on trunk line 2 is conversing with the party on line 1. With all the keys in their normal position, the called subscriber can answer a call on line 3 and talk to the party on line 3 over the following circuit: terminal 93, contact 123, contact 118, contact 92, through the substation circuit 101 in the usual manner, contact 91, contact 117, contact 124 and terminal 94.

Upon completion of the talking between the party on the trunk line 2 and the party on the local line 1, the polarized relay is deenergized upon the restoring of the handset of the local line, which again reverses the battery potential to normal. The polarized relay only operates on reversed battery when there is a ground on terminal 129 and a negative potential on terminal 128. When the local line subscriber restores his handset, he released the switch train and thereby took off the negative potential on terminal 128. In so doing the polarized relay became deenergized thereby causing contacts 112, 114, and 116 to make and causing contacts 111, 113, and 115 to break. Since 111 breaks, the locking circuit is also opened. Since contact 113, and 115 break, line 2 is no longer connected to line 1.

When the called subscriber completed his conversation with the party on line 3, he restores his handset 6. In so doing all keys are restored to normal position. Since the polarized relay was deenergized, the telephone set is once again prepared for future use.

While the invention has been described with a certain degree of particularity, it should be apparent that numerous modifications may be resorted to without departing from the spirit and scope of the invention as defined in the appended claims.

What is claimed is:

1. In a telephone substation set, a first line key having a normal and an operated position, a first hold key individual to said first line key and having a normal and an operated position, a second line key having a normal and an operated position, a second hold key individual to said second line key and having a normal and an operated position, mechanical means responsive to the operation of any one of said hold keys from its normal position to its operated position for restoring the one line key individual to said one operated hold key to its normal position in case said one line key is in an operated position; and mechanical linkage responsive to the operation of any one of said line keys from its normal position to its operated position for restoring the other line key to its normal position in case said other line key is in an operated position and for restoring the hold key, individual to said one operated line key, to its normal position in case said last mentioned hold key is in an operated position.

2. In a telephone system, a substation, a first line, a second line, a first line connecting key in said substation terminatnig said first line, a second line connecting key in said substation terminating said second line, a first holding key individual to said first line connecting key for holding said first line, a second holding key individual to said second line connecting key for holding said second line, a first member common to said first line connecting key and said first holding key, a second member common to said second line connecting key and said second holding key, a third member common to said first and second line connecting keys; and mechanical interconnecting means for operating said third member in response to the operation of either one of said line connecting keys from its normal position to its operated position to restore the other line connecting key to its normal position in case it is in an operated position, and for operating either said first or said second member, dependent upon which one of said line connecting keys is operated from its normal position to its operated position, to simultaneously restore the holding key individual to the said one operated line connecting key in case such last mentioned holding key is in its operated position.

3. In a telephone system, a substation set including a substation circuit, a first line connecting key in said set having a normal and an operated position, a first line terminating in said first line connecting key, a first holding key individual to said first line connecting key and having a normal and an operated position, a second line connecting key in said set having a normal and an operated position, a second line terminating in said second line connecting key, a second holding key individual to said second line connecting key and having a normal and operated position, a first member common to said first line connecting and holding keys, a second member common to said second line connecting and holding keys, a third member common to said first and said second line connecting keys, means responsive to the operation of any one of said line connecting keys from its normal position to its operated position for operatively connecting the one of said lines terminating in said one operated key to said substation circuit, means responsive to the operation of the one holding key individual to said one operated line connecting key for holding said line terminating in said one operating line connecting key; and mechanical interconnecting means for operating said third member in response to the operation of either of said line connecting keys from its normal position to its operated position to restore the other line connecting key to its normal position in case it is in an operated position, and for operating either said first or said second member, dependent upon which one of said line connecting keys is operated, from its normal position to its operated position, to simultaneously restore the holding key individual to the said one operated line connecting key in case such last mentioned holding key is in its operated position.

4. In a telephone system, a substaton set including a substation circuit, a first line connecting key in said set having a normal and an operated position, a first line terminating in said first line connecting key, a first holding key individual to said first line connecting key and having a normal and an operated position, a second line connecting key in said set having a normal and an operated position, a second line terminating in said second line connecting key, a second holding key individual to said second line connecting key and having a normal and operated position, means responsive to the operation of any one of said line connecting keys from its normal to its operated position for operatively connecting the one of said lines terminating in said one operated line connecting key to said substation circuit, means responsive to the operation of the one holding key individual to said one operated line connecting key for holding said one line terminating in said one operated line connecting key, mechanical means also responsive to the operation of said one holding key for automatically restoring said one operated line connecting key to its normal position to disconnect said substation circuit from said one line, and mechanical linkage between said first and second line connecting keys also responsive to the operation of said one line connecting key from its normal to its operated position for automatically restoring the other of said line connecting keys to its normal position in case said other line connecting key is in an operated position to thereby disconnect said other line from said substation circuit.

5. In a telephone system, a substation having a substation circuit, a trunk line terminating in said substation, a local line terminating in said substation, means in said substation for connecting said circuit to said trunk line, means in said substation for disconnecting said circuit from said trunk line and for holding said trunk line, means in said substation for connecting said circuit to said local line, a relay in said substation, and means operated by said relay for connecting said trunk line to said local line and for disconnecting said circuit from said local line.

6. A telephone system as claimed in claim 5 including a locking circuit for said relay controlled over said local line for maintaining the said connection between said local line and said trunk line.

7. In a telephone system, a substation having a substation circuit, a trunk line terminating in said substation, a local line terminating in said substation, a third line terminating in said substation and normally connected to said substation circuit, a trunk key individually to said trunk line, means responsive to the operation of said trunk key for disconnecting said substation circuit from said third line and for connecting said substation circuit to said trunk line to establish a connection thereover, a hold key individual to said trunk line; means responsive to the operation of said hold key for holding said trunk line, for disconnecting said substation circuit from said trunk line and for reconnecting said substation circuit to said third line; a line connecting key individual to said line, means responsive to the operation of said line connecting key for disconnecting said substation circuit from said third line and for connecting said substation circuit to said local line to establish a connection thereover, a relay in said substation, a transfer key in said substation, means responsive to the operation of said transfer key for operating said relay over said local line connection, circuits completed by the operation of said relay for connecting said local line to said trunk line to establish a connection thereover through said substation, and mechanical means also controlled by the operation of said transfer key for restoring said hold key to remove the holding condition from said trunk line and for restoring said line key to disconnect said substation circuit from said local line and to reconnect said substation circuit to said third line.

8. In a telephone system, a substation; a first, second and third line terminating in said substation; a holding circuit for each of said lines in said substation; holding means individual to each line and operative for closing and opening said holding circuits; a supporting member in said substation; a handset in said substation adapted to rest in said supporting member when not in use; parallel operating members individual to each of said holding means for the said first and said second line; an unlocking member individual to said holding means for said third line; and mechanical means provided for operating said parallel operating and unlocking member to restore any operated holding means responsive to said handset being placed on said supporting member.

9. In a telephone system, a substation; a first, second and third line terminating in said substation; a holding circuit for each of said lines in said substation; holding means individual to each line and operative for closing and opening said holding circuits; a supporting member in said substation; a handset in said substation adapted to rest on said supporting member when not in use; parallel operating members individual to each of said holding means for the said first and second lines; mechanical means including said parallel operating members for restoring any operated holding means and for disabling said holding means against manual operation responsive to the handset being placed on said supporting member; a substation circuit in said substation; and line connecting means in said substation operable independently of said parallel operating members and said mechanical means for connecting said first and second lines to said substation circuit.

10. In a telephone system, a substation; a handset resting on said substation when not in use; an extension line terminating in said substation; a first mechanical means, having a normal, first and second operating positions, providing for inclusion of said extension line when in a normal operating position and for exclusion of said extension line when in a first operated position; means operated by said first mechanical means for signalling said extension line when in a second operating position; and second mechanical means operated to restore said first mechanical means from its first operated position to its normal position in response to placing of said handset on said substation.

11. In a telephone instrument having a first and second pair of push buttons and having a first, second, third, fourth and fifth restoring means; a cover; a mounting bracket secured to said cover; a first right angle extension and first push button mounting ear forming one side of said mounting bracket; a second right angle extension and second push button mounting ear forming the opposite side of said mounting bracket; a first pair of holes bored in said first push button mounting ear for mounting a first pair of push buttons, a second pair of holes bored in said second push button mounting ear for mounting a second pair of push buttons, and said first pair of holes lie in the same plane as said second pair of holes; a first downward right angle extension extending from said first push button mounting ear for guiding movement of first pair of push buttons; a second downward right angle extension extending from said second push button mounting ear for guiding movement of second pair of push buttons; a first hole bored in said first downward right angle extension for mounting a first restoring means; a second hole bored in said second downward right angle extension for mounting a second restoring means; an upward right angle extension forming said mounting bracket positioned equal distances from said first push button mounting ear and said second push button mounting ear; a third hole bored in said upward right angle extension for mounting a third restoring means; a fourth hole bored in said first right angle extension for mounting a fourth restoring means; a fifth hole bored in said second right angle extension for mounting a fourth restoring means and said fourth hole and said fifth hole are in parallel planes so that a member extending into both holes will be perpendicular to said first right angle extension and said second right angle extension.

12. In a telephone desk set of the self contained type, a cover; a first pair of push buttons mounted on said cover and extending into the interior portion of said cover; a second pair of push buttons mounted on said cover and extending into the interior portion of said cover at the side opposite of the said first pair of push buttons; a mounting bracket for securing both said first pair of push buttons and said second pair of push buttons to said cover; a first member mounted on said mounting bracket to engage either push button of said first pair to restore to normal position one of said push button of said first pair in response to the operation of the other push button of said first pair; a second member mounted on said mounting bracket to restore one of said push buttons of said second pair to normal position in response to the operation of the other of said push button of said second pair; a third member secured to said mounting bracket and positioned between said first pair of push buttons and said second pair of push buttons, and said third member operable by a certain one push button of one of said pairs of push buttons to restore to normal position a certain other push button of the other of said pairs of push buttons; a restoring means mounted on said mounting bracket comprising two parallel members, a fourth member connecting the said two parallel members and a fifth member secured to the said fourth member, and said restoring means operative to restore to normal position a certain one push button of said first pair and a certain one push button of said second pair in response to operation of said fifth member.

13. In a telephone desk set, the combination of a cover, a plurality of push buttons each having one end extending through said cover for manual operation thereof, a set of springs individual to each of said push buttons, a mounting bracket comprising a single sheet of metal, and means for securing said bracket inside said cover, integral extensions of said bracket having apertures for mounting said sets of springs for cooperation with their individual push buttons, U-shaped integral members of bracket, each said member being individual to a pair of said push buttons, and said members each having a pair of apertures individual to each of said push buttons for guidably mounting said push buttons within said cover.

14. In a telephone desk set as claimed in claim 13 including a lever pivotally mounted on each of said members and operable by the operation of either push button of one pair individually mounted on one of said members to restore the other push button of said one pair.

15. In a telephone desk set as claimed in claim 13 including a lever pivotally mounted on said bracket and operable in response to the operation of one push button of one of said pairs to restore another of said push buttons in another of said pairs.

16. A telephone subscriber's substation having a handset and a cradle therefor, a first plunger in said cradle operably controlled by said handset, a manually operable plunger outside of said cradle having a normal, a first and a second position, a first set of contact spring actuated in response to said manually operable plunger being moved from a normal position to a first position, and said first set of contact springs holding said manually operable plunger in the first position, a second set of contact springs actuated in response to said manually operable plunger being moved from a normal position to a second position, and said second set of contact springs restoring said manually operable plunger from the second position to a normal position in response to the removal of the force manually operating said plunger to its second position, a mechanical means including an unlocking arm for restoring said manually operable plunger in response to said handset depressing said first plunger in said cradle to cause said unlocking arm to restore said manually operable plunger from a first position to a normal position.

17. In a telephone substation set, a substation circuit; a first and second answer key each having a normal and depressed position; a first set of contact springs actuated by said first answer key; a second set of contact springs actuated by said second answer key; a first line terminating in said first set of contact springs and said first line connected to said substation circuit only in response to said first answer key being in a depressed position; a second line terminating in said second set of contacts springs and said second line connected to said substation circuit only in response to second answer key being in a depressed position; a third line terminating in said substation circuit and said third line connected to said substation only in response to both first and second answer keys being in a normal position; a first and second holding key each having a normal and depressed position; a third set of contact springs actuated by said first holding key; a fourth set of contact springs actuated by said second holding key; a first holding circuit terminating in said third set of contact springs to hold said first line in response to said first holding key being depressed, and a second holding circuit terminating in said fourth set of contact springs to hold said second line in response to said second holding key being depressed.

FREDERIC E. WOOD.
ROBERT L. SARGISSON.

REFERENCES CITED

The following references are of record in the file of this patent:

UNITED STATES PATENTS

| Number | Name | Date |
|---|---|---|
| 1,783,310 | Saunders | Dec. 2, 1930 |
| 2,212,216 | Tradup | Aug. 20, 1940 |
| 2,218,328 | Curran | Oct. 15, 1940 |
| 2,273,530 | King | Feb. 17, 1942 |
| 2,306,203 | Anderson | Dec. 22, 1942 |
| 2,338,757 | Curran | Jan. 11, 1944 |
| 2,341,711 | Given | Feb. 15, 1944 |
| 2,356,031 | Carroll | Aug. 15, 1944 |

OTHER REFERENCES

"Telephony," May 28, 1949, pages 45 and 46.